April 14, 1936.  A. TSCHIERSCHWITZ  2,037,400
GAS BURNER
Filed Nov. 21, 1934   3 Sheets-Sheet 1

April 14, 1936.   A. TSCHIERSCHWITZ   2,037,400
GAS BURNER
Filed Nov. 21, 1934   3 Sheets-Sheet 3

Inventor
Albert Tschierschwitz
By Alexander Dowell
Attorneys

Patented Apr. 14, 1936

2,037,400

UNITED STATES PATENT OFFICE 2,037,400

GAS BURNER

Albert Tschierschwitz, Belleville, Ill.

Application November 21, 1934, Serial No. 754,158

10 Claims. (Cl. 158—115)

This invention relates to gas burners or the like, and the principal object of the invention is to provide a combination gas burner, heat accumulator, and self-lighter, the gas burner having large and small concentric burner plates which are indirectly used for cooking; and the heat accumulator being disposed above the gas burner plates and being heated by the combustion gases of the flames which pass upwardly through tapered channels in the heat accumulator heating the ribs which separate the tapered channels, and the air which is drawn into the assembly is also heated and passed through the tapered channels, the heat of the accumulator being dissipated for cooking purposes. The arrangement of the heat accumulator renders it impossible to extinguish the flames of the burner by boiling over of the heated cooking utensil, and effects a saving in gas and gives greater heat which are essential features of my invention.

Another object of the invention is to provide a novel self-lighter comprising a casing housing a pilot light, and having ducts leading from the burner caps whereby the escaping gas from such burners will collect in the ducts and will be ignited by the pilot light, and the ignited gas in the ducts will flare back and light the burner, or re-light an accidentally extinguished burner.

Other minor objects of the invention will be hereinafter set forth.

I will explain the invention with reference to the accompanying drawings which illustrate one practical embodiment thereof to enable others familiar with the art to adopt and use the same; and will summarize in the claims the novel features of construction, and novel combinations of parts, for which protection is desired.

In said drawings:

Fig. 6 is an enlarged section on the line 6—6, Fig. 1.

Figure 1:
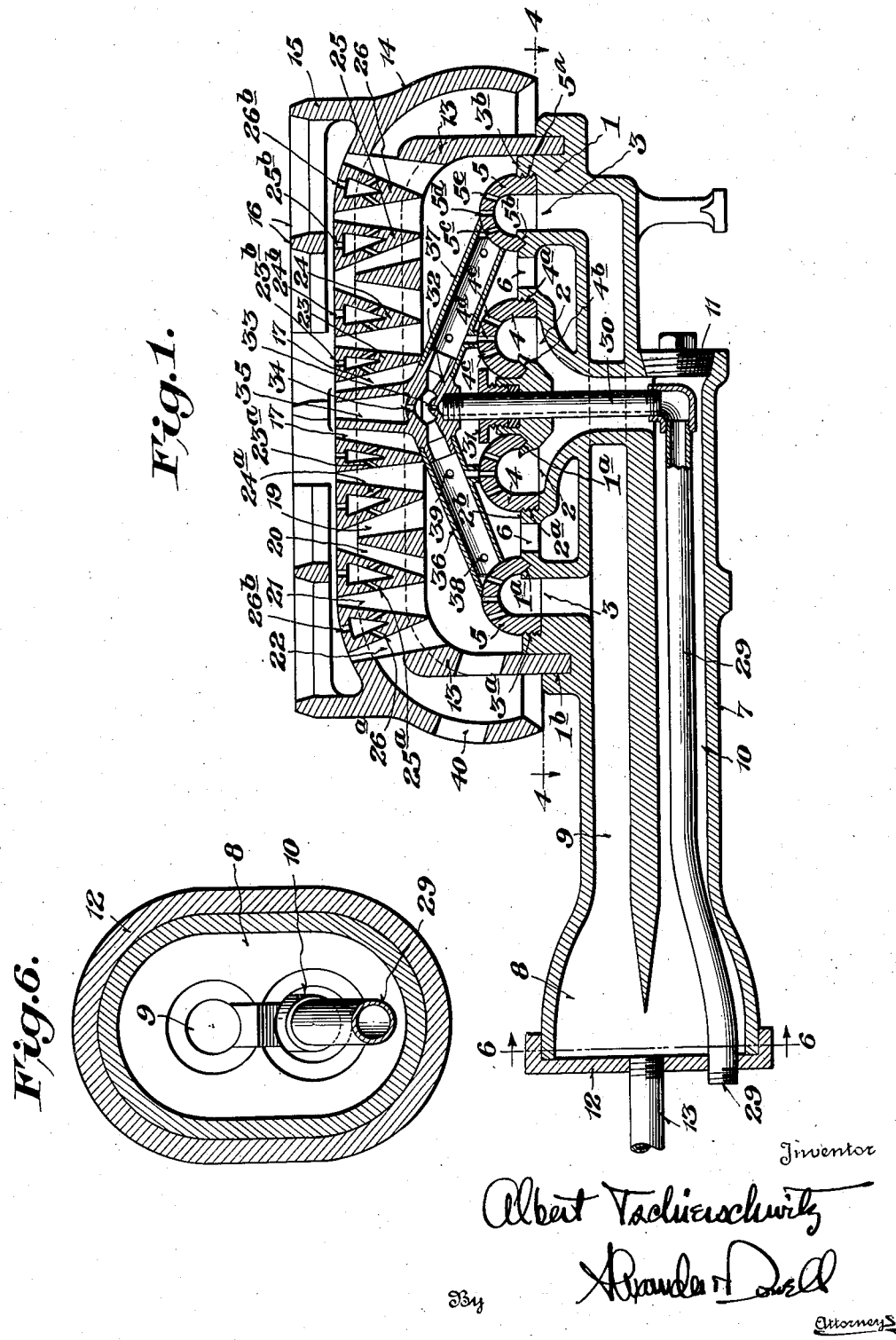
Fig. 1 is a vertical section through the assembled gas burner, heat accumulator, and self-lighter.

As shown, the burner preferably comprises a hollow circular base 1 provided in its upper face with an inner annular series of gas ports 2, and with an outer annular series of gas ports 3, above which ports 2, 3 the inner and outer burner caps 4, 5 are mounted, as hereinafter explained. Between the annular gas ports 2 and 3 is an annular air channel 6 for permitting air to be drawn therein between the burner caps by the gas flames.

Figure 5:
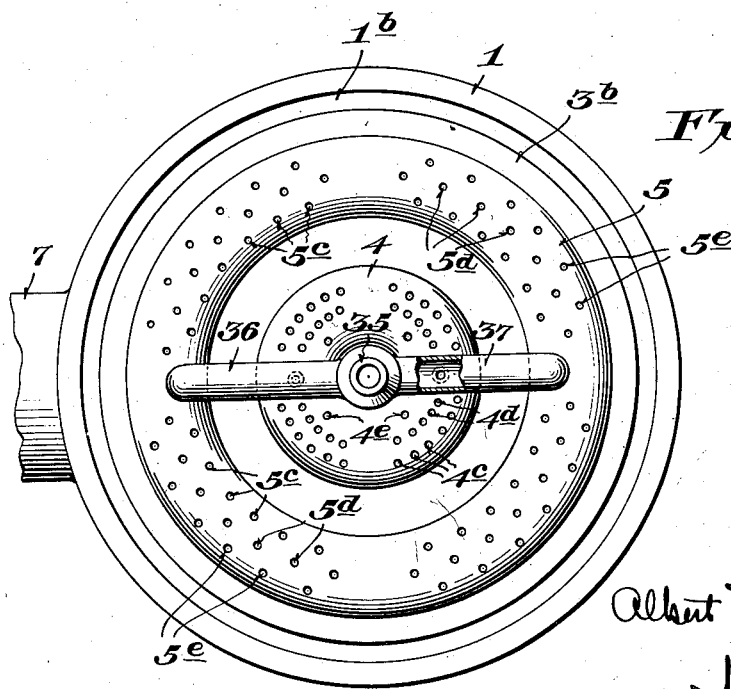
Fig. 5 is a plan view of the burner showing the self-lighter mounted thereon.

The inner gas burner cap 4 is preferably annular in shape, and is substantially semi-circular in cross-section; and its outer periphery is threaded as at 4a for engagement with threads 2a in a raised annular rib 2b (Fig. 1) on the base 1 around the inner gas ports 2 whereby the burner cap may be screwed into and out of place upon the base 1. The outer gas burner cap 5 is likewise annular in shape and of substantially semi-circular cross-section, and its outer periphery is threaded as at 5a for engagement with threads 3a in a raised rib 3b on the base 1 around the outer gas ports 3, whereby the cap 5 may be screwed into place. The inner edges of the inner and outer gas burner caps 4 and 5 are preferably beveled as at 4b, 5b (Fig. 1) to seat in correspondingly shaped recesses 1a in the upper face of the base 1 adjacent the ports 2, 3. The semi-circular faces of caps 4 and 5 are each provided with inner, intermediate and outer rows of perforations 4c, 4d, 4e and 5c, 5d, 5e respectively (Figs. 1 and 5) which form the burner jets or nozzles.

The inner and outer annular series of gas ports 2, 3 communicate respectively with a tubular manifold 7 formed integrally with or separably from base 1, the manifold 7 having an air and gas mixing chamber 8 at its inlet, and having a pair of ducts 9 and 10 extending from the mixing chamber, one duct 9 communicating directly with the outer gas ports 3, and the other duct 10 communicating directly with the inner gas ports 2, whereby the mixture of gas and air from chamber 8 is delivered in proper amounts to the inner and outer burner caps 4 and 5. The entrance of air to mixing chamber 8 is controlled by the usual adjustable plate valve 12 through which enters the main gas pipe 13. Suitable valves may control the passage of gas through the ducts 9 and 10. The gas duct 10 extends inwardly to a point adjacent the center of base 1 and from thence extends upwardly to feed the inner gas ports 2. A removable plug 11 is threaded in the inner end of duct 10.

Above base 1 is a relatively thick heat accumulator casting of general inverted cup-shape, having a lower depending annular flange 13 mounted in a groove 1b in the upper face of the base 1 exterior to the annular ports 3 as clearly shown in Fig. 1. Around the flange 13 is an upper or outer flange or skirt 14 which is spaced from the flange 13, said skirt 14 having an upstanding flange 15 on its upper end which carries the grill 16 in the usual manner for holding cooking utensils to be heated.

At the center of the heat accumulator is an upwardly contracting circular opening adapted to receive a correspondingly shaped extension 35 of the self-lighter 32 hereinafter referred to. The space between the self-lighter 35 and the walls of the bore forms a restricted annular channel 17 for the passage of combustion gases discharged from the inner burner, the channel contracting towards its upper end, the axis of the bore 17 being in substantial alignment with the axis of the inner row of gas burner jets 4c in the inner burner cap 4. In alignment with the central burner jets 4d of the inner burner cap 4 is a second annular channel 18 for the products of combustion contracting towards its upper end, said channel 18 being disposed substantially directly above the cap 4; and in substantial alignment with the axis of the outer burner jets 4e of the inner burner cap 4 is a third annular channel 19, for the products of combustion also contracting towards its upper end, the channels 19, 18, 17, being disposed substantially equal distances from the center of the heat accumulator casting, and the axes of the channels 17, 18 and 19, diverging upwardly from the inner annular series of gas ports 2 as indicated.

In substantial axial alignment with the axis of the inner gas jets 5c of the outer burner cap 5 is an annular channel 20, which channel contracts towards its upper end, and meets the upper face of the heat accumulator at substantially the same point as the channel 19, as indicated in Fig. 1. In axial alignment with the central jets 5d in the outer burner cap 5 is an annular channel 21 for the products of combustion also contracting towards its upper end; and in alignment with the outer jets 5e of the outer burner cap 5 is an annular channel 22 contracting towards its upper end, the axes of the channels 20, 21, and 22 diverging upwardly from the outer annular gas ports 3.

Figure 2:
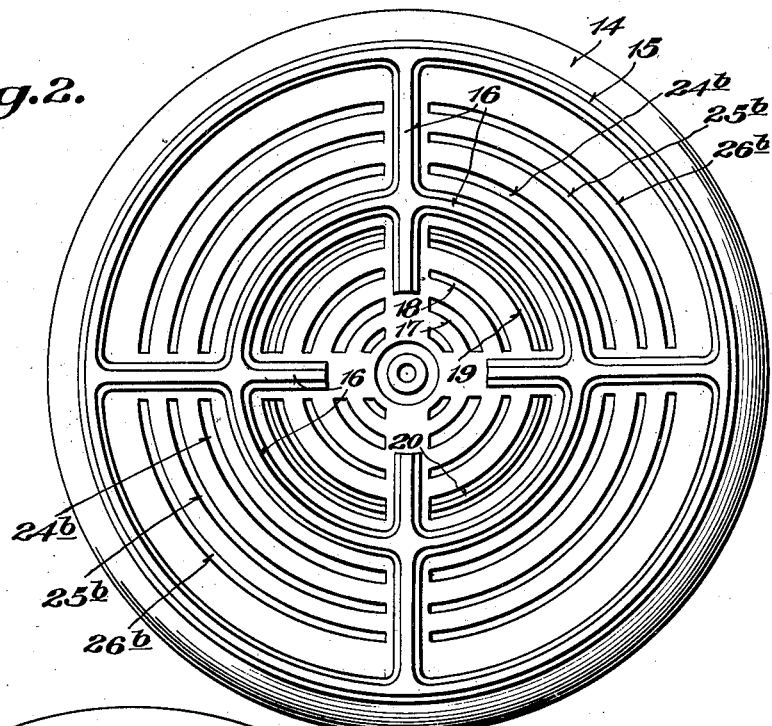
Fig. 2 is a top plan view of the heat accumulator, detached.
Figure 3:
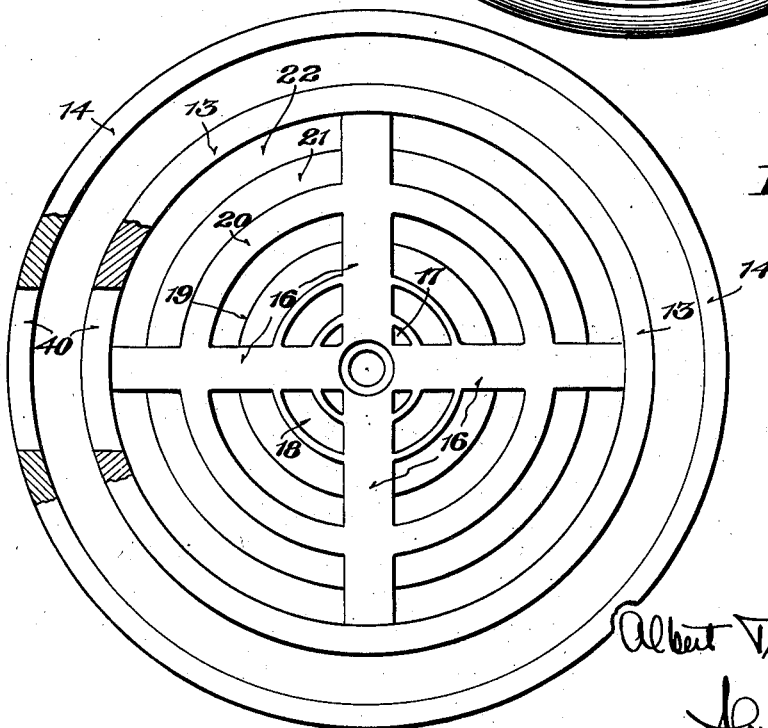
Fig. 3 is a bottom plan view of the heat accumulator, detached.
Figure 4:
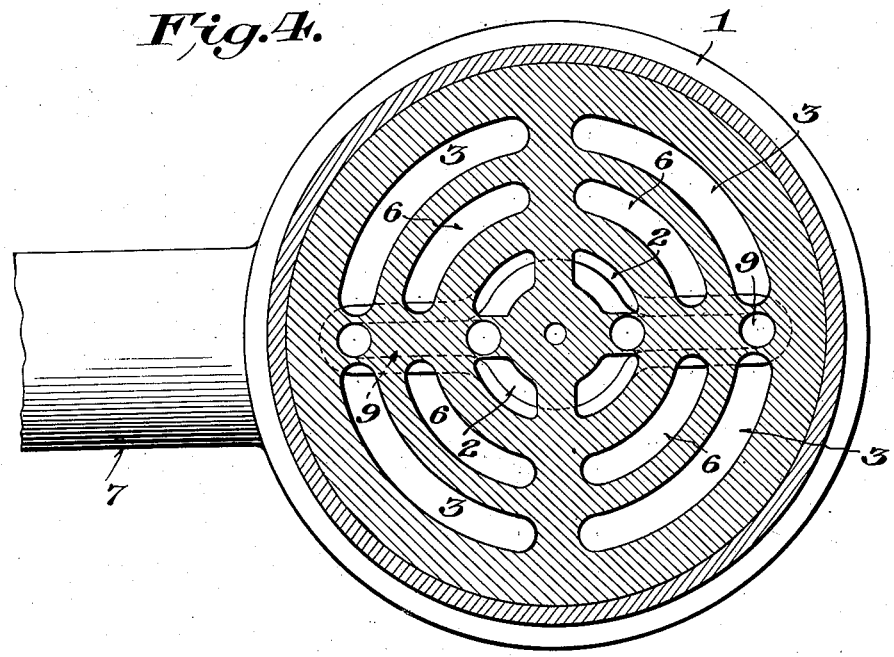
Fig. 4 is a section on the line 4—4, Fig. 1.

Preferably the annular ribs 23, 24, 25, 26 which are formed between the channels 17, 18, 19 and 20, 21, 22, and which ribs are of inverted triangular cross-section, are hollow and are provided with ducts 23a, 24a, 25a, 26a leading from the walls of the channels 17—22 inclusive into the hollow interiors of the annular ribs; and in the upper ends of the ribs 23, 24, 25, 26 are annular slots 23b, 24b, 25b, 26b. The ribs 23—26 are supported integrally with the heat accumulator casting by means of webs as shown in Figs. 2 and 3.

By means of the above construction the cooking utensil being heated is not heated directly by the gas flame. The flame of the burner generates heat within and below the heat accumulator, and air is drawn into the space between the burner caps 4, 5 and the heat accumulator through the air channels 6. The products of combustion and the heated air pass upwardly through the annular channels 17—22 and disperse heat evenly throughout the metal of the heat accumulator, the heated gases and air also entering through the ducts 23a—26a into the hollow interiors of the ribs 23—26, and passing upwardly through the slotted openings 23b—26b. Thus the cooking is not effected by direct contact with the flames, and a more even heat and a saving in gas is effected.

Extending through the gas duct 10 is a pipe 29 which has an upstanding branch 30 extending through the center of base 1, a stuffing box 31 being provided to prevent the escape of gas along the pipe 30. The upper end of the pipe 31 is threaded to engage a correspondingly threaded portion in the self-lighter casing 32. A burner tip 33 is provided in the casing 32 which tip when lighted serves as a pilot light. The lighter casing 32 consists of a substantially inverted V-shaped hollow member disposed diametrically of the burner caps 4 and 5, and has its center arched upwardly with the pilot light jet 33 disposed at the apex. The casing 32 above the jet 33 is provided with a restricted opening 34 which supplies sufficient air to support combustion of the pilot light and also serves as a means for lighting the pilot light. Around the restricted opening is a hollow extension 35 which terminates flush with the upper surface of the heat accumulator, the exterior wall of extension 35 forming the inner wall of the channel 17.

The branches 36—37 of the lighter 32 receive gas directly from certain jets in the gas burner caps 4 and 5 whereby when the gas is turned on the escaping gas from the burner cap jets will pass directly into the hollow lighter casing branches 36—37 and when sufficient gas has accumulated therein the pilot light at jet 33 will ignite the gas in the lighter, causing same to flare back and shoot a flame across the burners through openings 38—39 and light the burner jets; or in case the burner jets have been accidentally extinguished while the gas is still turned on, the procedure will result in an automatic re-lighting of the burner jets.

At 40 is provided a view glass or opening for inspecting the gas flames at the burner caps 4 and 5. The heat accumulator 13—14 may be cast in one piece with the lighter chamber 32, and the assembly mounted on the gas lighter pipe 30, and hence heat accumulator 13, 14, is removable while resting on base 1.

I claim:

1. In combination; a base; a gas burner cap on the base having concentric annular series of jet orifices therein; means for conducting fuel mixture to said cap; a heat accumulator casing on the base overlying the cap having concentric annular channels therein and having an opening at its center; a self-lighter flash tube in gas conducting relationship with the burner cap having a hollow extension communicating with the tube and entering the opening and terminating substantially flush with the upper face of the accumulator, said extension forming with the walls of the opening an annular heat channel; a pilot jet in the tube below said extension; and means for supplying gas to the pilot jet.

2. In a combination as set forth in claim 1, the annular series of ribs defining the channels being hollow and having openings in their sides and upper ends so that the combustion gases will pass therethrough.

3. In a combination as set forth in claim 1, said annular channels in the accumulator being disposed in substantial alignment with their respective annular series of jet orifices in the burner cap, and the channel formed between the extension and opening being in substantial alignment with the inner annular series of jet orifices.

4. In a combination as set forth in claim 1, the annular series of ribs defining the channels being hollow and having openings in their sides and upper ends so that the combustion gases will pass therethrough; and said annular channels in the accumulator being disposed in substantial alignment with their respective annular series of jet orifices in the burner cap.

5. In combination, a base, an inner annular gas burner cap; an outer annular gas burner cap; said caps having annular series of jet orifices therein; means in the base for conducting a mixture of gas and air to said caps; and a heat accumulator casing mounted on the base overlying said caps and having concentric annular channels therein disposed in substantial alignment with the axes of the jet orifices of the burner caps; the ribs defining the channels of the accumulator being hollow and having openings in their sides and upper ends so that the combustion gases will pass therethrough.

6. In a combination as set forth in claim 5, said accumulator having an opening at its center; a self-lighter comprising a hollow casing spanning the burner caps and having a hollow extension communicating with the casing and entering the opening in the accumulator and forming with the walls of the opening an annular channel; a pilot jet in the casing below the extension; means for supplying gas to the pilot jet; and said casing having openings therein registering with jets of the burner caps, whereby gas entering the casing through the openings will be ignited by the pilot jet, and a flame will flash back through the openings to ignite the jets at the burner caps.

7. In combination, a base, an inner annular gas burner cap; an outer annular gas burner cap; said caps having annular series of jet orifices therein; means in the base for conducting a mixture of gas and air to said caps; and a heat accumulator casing mounted on the base overlying said caps and having concentric annular channels therein contracting towards their upper ends and disposed in substantial alignment with the axes of the jet orifices of the burner caps; the ribs defining the channels of the accumulator being hollow and having openings in their sides and upper ends so that the combustion gases will pass therethrough.

8. In a combination as set forth in claim 7, said accumulator having an opening at its center; a self-lighter comprising a hollow arched casing spanning the burner caps and having a hollow extension communicating with the casing and entering the opening and terminating at the upper end of the accumulator and forming with the walls of the opening an annular channel; a pilot jet in the casing below the extension; means for supplying gas to the pilot jet; and said casing having openings therein registering with jets of the burner caps, and having other openings adjacent the burner caps, whereby gas entering the casing through the first mentioned openings will be ignited by the pilot jet and a flame will flash back through the second mentioned openings to ignite the jets of the burner caps.

9. In combination with a gas burner, a heat accumulator overlying said burner, said accumulator having a series of concentric annular channels therein contracting towards their upper ends, the annular series of ribs defining the channels being hollow and having openings in their sides and upper ends so that the combustion gases will pass therethrough.

10. In a combination as set forth in claim 9, said accumlator having an opening at its center; a self-lighter comprising a hollow arched casing above the burner and having a hollow extension communicating with the casing and entering the opening and terminating flush with the upper end of the accumulator and forming with the walls of the opening an annular channel; a pilot jet in the casing below the extension; means for supplying gas to the pilot jet; and said casing having an opening therein registering with a jet of the burner, whereby gas entering the casing through the opening will be ignited by the pilot jet and a flame will flash back through the opening to ignite the burner.

ALBERT TSCHIERSCHWITZ.